United States Patent [19]

Berrie et al.

[11] 4,120,737

[45] Oct. 17, 1978

[54] MANUFACTURE OF CALCIUM SULPHATE ALPHA HEMIHYDRATE

[75] Inventors: John Sorbie Berrie; Graham Edward Woolley, both of Runcorn, England

[73] Assignee: Imperial Chemical Industries Limited, London, England

[21] Appl. No.: 570,946

[22] Filed: Apr. 22, 1975

[30] Foreign Application Priority Data

May 3, 1974 [GB] United Kingdom ............... 19444/74

[51] Int. Cl.$^2$ ............................................. C04B 11/00
[52] U.S. Cl. .................................... 106/109; 106/110; 423/163; 423/166; 423/170; 423/555
[58] Field of Search ................ 106/109, 110; 423/163, 423/166, 170, 555

[56] References Cited

U.S. PATENT DOCUMENTS

| 601,006 | 3/1898 | Sturcke | 423/163 |
|---|---|---|---|
| 2,413,799 | 1/1947 | Sullivan | 423/555 |
| 3,302,997 | 2/1967 | Heuer | 423/166 |

FOREIGN PATENT DOCUMENTS

| 150,396 | 9/1973 | Czechoslovakia. | |
| 11,638 of | 1891 | United Kingdom | 423/166 |

| 345,099 | 8/1972 | U.S.S.R. | |

OTHER PUBLICATIONS

"Manufacture of Soda, with Special Reference to the Ammonia Process", Te-Pong How, American Chemical Society Monograph Series, Reinhold Publishing Corp., N.Y., N.Y., 1942, pp. 253-254.

*Primary Examiner*—R. Dean
*Assistant Examiner*—John P. Sheehan
*Attorney, Agent, or Firm*—Cushman, Darby & Cushman

[57] ABSTRACT

A process for the manufacture of calcium sulphate alpha-hemihydrate which comprises the step of interacting an aqueous solution of calcium chloride and a source of sulphate or bisulphate ions in an aqueous system at a temperature above the calcium sulphate hemihydrate/gypsum transition temperature under the reaction conditions. The preferred reagents are the waste calcium chloride/sodium chloride effluent of the ammonia soda process and sulphuric acid (e.g. impure sulphuric acid effluent) to give hydrochloric acid as a co-product. The preferred reaction temperature is at least 20° C. above the transition temperature (about 70° C), e.g. at 95°–100° C at atmospheric pressure.

9 Claims, No Drawings

MANUFACTURE OF CALCIUM SULPHATE ALPHA HEMIHYDRATE

The present invention relates to a process for the manufacture of calcium sulphate alpha-hemihydrate.

Plaster of Paris ($CaSO_4.\frac{1}{2}H_2O$) is extensively used to manufacture plasterboard and various plaster products. It is usually produced in the form of beta-hemihydrate by the dry calcination of natural or synthetic by-product gypsum. The other form of Plaster of Paris, namely alpha-hemihydrate, is a highly crystalline material which is believed to be superior to the beta form in that it can give a stronger set product and requires less drying. The alpha-hemihydrate is produced, for example, by heating a slurry of gypsum and liquid water under pressure in an autoclave, for example as described in the specification of our UK Pat. No. 1,051,849.

Russian Pat. No. 345,099 describes the preparation of gypsum ($CaSO_4. 2 H_2O$) by the interaction of an aqueous solution of calcium chloride and dilute sulphuric, and in particular, by the interaction of the calcium chloride containing liquor produced as a waste effluent in the ammonia soda process and sulphuric acid containing organic impurities, for example impurities from the production of vinyl chloride and ethyl chloride.

Czech Pat. No. 150,396 describes the preparation of alpha-hemihydrate by neutralising waste waters containing sulphuric acid and sulphates with lime or limestone at a temperature of 90° C. to 150° C.

We have now found that calcium chloride solution and sulphate ions can be reacted to produce the desired alpha-hemihydrate. This provides a simple and effective alternative process to the autoclave process referred to above, avoids the further step of having to convert gypsum (e.g. as produced by the process described in Russian Pat. No. 345,099) to alpha-hemihydrate, and provides a process which is readily controllable (as compared with the process described in Czech. Pat. No. 150,396) since it involves the interaction of two solutions.

According to the present invention we provide a process for the manufacture of calcium sulphate alphahemihydrate which comprises the step of interacting an aqueous solution of calcium chloride and a source of sulphate or bisulphate ions in an aqueous system at a temperature which is above the calcium sulphate hemihydrate/calcium sulphate dihydrate (gypsum) transition temperature apertaining under the reaction conditions.

It is especially convenient to use the calcium chloride containing liquor which is produced as a waste effluent in the ammonia soda process. Thus in the distillation stage of the ammonia soda process, ammonium chloride liquors are heated with milk of lime in distillers to recover ammonia. An equivalent amount of calcium chloride is formed at the same time and remains in solution together with any sodium chloride that has passed through the process. Mixed with and suspended in this solution are various insoluble calcium compounds, for example aluminates, silicates, carbonates and sulphates, and other insoluble materials introduced into the system via the lime. The suspension of waste solids in the calcium chloride/sodium chloride liquor leaving the distiller is usually allowed to settle, and the clear liquor overflowing from the settlers provides a source of calcium ions for use in the process according to the invention. Typically, the calcium chloride/sodium chloride effluent from the ammonia soda process contains 10.5% $CaCl_2$, 8.0% NaCl on a weight/volume basis.

It is convenient to use sulphuric acid as the source of sulphate ions, although other sulphate or bisulphate containing liquors, e.g. sodium sulphate or bisulphate solutions, are also suitable. A range of aqueous solutions of sulphuric acid containing up to 98 percent by weight of $H_2SO_4$ may be used, and also fuming sulphuric acid or oleum, but it is preferred to use sulphuric acid solutions containing from 40% to 98% by weight of $H_2SO_4$. It is especially convenient to use impure sulphuric acid effluents which are produced in a number of industrial processes, for example the sulphuric acid/ammonium sulphate effluents obtained as by-products in the manufacture of methyl methacrylate and of sodium cyanide, and the waste sulphuric acid obtained after being used as a drying agent (e.g. for drying chlorine gases, or chloromethanes).

In an aqueous system containing no other ions than calcium ions and sulphate ions, the hemihydrate/gypsum transition temperature is 97° C. The transition temperature is affected, however, to some extent by the actual concentrations of the calcium ions and the sulphate ions and to a much greater extent by the concentrations of other ions which may be present, especially chloride ions. In the presence of chloride ions, the transition temperature is lowered. For example when reacting the calcium chloride/sodium chloride solutions with sulphuric acid, the transition temperature is reduced to about 70° C. at a chloride concentration of 98 g/liter.

The process may be carried out at any temperature above the transition temperature, but the degree of conversion of the reacting materials to alpha-hemihydrate increases with increase in temperature and increase in residence time. The process is preferably carried out at a temperature of at least 20° C. above the transition temperature, and especially in a temperature range of 50° to 100° C. above the transition temperature. Thus when interacting the calcium chloride/sodium chloride effluent from the ammonia soda process and sulphuric acid, for example, whence the transition temperature is about 70° C., the process may conveniently be carried out at 95° to 100° C. at atmospheric pressure, or preferably at a temperature of at least 140° C., for example 150° to 160° C., at a superatmospheric pressure (for example between 5 and 10 atmospheres absolute). The residence time is conveniently in the range 0.5 minute to 60 minutes, and preferably in the range 5 minutes to 15 minutes.

The process may be carried out in the presence of crystal habit modifiers which are known to assist in the production alpha-hemihydrate of commercially useful crystalline structure, for example when producing alphahemihydrate from gypsum as described in UK Pat. No. 1,051,849. The habit modifiers include, for example, inorganic salts of trivalent metal ions, such as iron, aluminium, chromium; and polar organic compounds, for example acids and salts of acids.

The process may be carried out batchwise if desired, but it is especially applicable to continuous production.

The alpha-hemihydrate may be separated from the reaction mixture by any convenient means for example by filtration or centrifuging, provided the temperature of the separation stage is maintained at a temperature above the hemihydrate/gypsum transition temperature in water, e.g. at about 100° C. The separated solids are suitably washed with water and the combined washings and filtrate (containing hydrochloric acid when using sulphuric acid or bisulphate ions as starting materials) are cooled, filtered to remove any calcium sulphate precipitated, and the hydrochloric acid is then collected. The moist calcium sulphate obtained in this latter filtration stage may be recycled to the process stage if desired.

The separated alpha-hemihydrate is heated to remove moisture, for example in a steam heated drier at 100° to 120° C.

It will be appreciated that the calcium chloride solution and the sulphate ions could be reacted at a temperature below the hemihydrate/gypsum transition point to precipitate gypsum, which may then be separated as a moist solid, and either decomposed directly (for example in a drier) or slurried and decomposed in an autoclave (for example as described in UK Pat. No. 1,051,849). Both these methods involve the additional step of converting gypsum to alpha-hemihydrate, whereas alpha-hemihydrate is produced directly in the process according to the present invention.

The dried alpha-hemihydrate produced in the present process may be used without further modification in the manufacture of plasterboard, wall blocks or as an inert filler. The process has the further advantage of producing hydrochloric acid as a useful by-product.

The present process also provides useful outlets for waste calcium chloride effluents produced in the ammonia soda process and for low grade sulphuric acids produced in a number of processes. The utilisation of such waste products reduces the environmental problems associated with their disposal.

The process is illustrated but not limited by the following example.

EXAMPLE 440 ml of 49% sulphuric acid were added to 4 liters of clear still liquor from the ammonia-soda process containing 38 g/liter calcium, 98 g/liter chloride and to which 5 g/liter aluminium sulphate had been added. The addition of sulphuric acid took place under agitation over 1.25 mins with the mixture held at 90° C. The mixture was stirred continuously for a further 3 minutes, then filtered under vacuum, washed with water and then dried. 549g of calcium sulphate alpha-hemihydrate were obtained, corresponding to a conversion, based on the sulphuric acid used, of 93.5%.

What we claim is:

1. A process for the manufacture of calcium sulphate alpha-hemihydrate which comprises the step of reacting an aqueous solution of calcium chloride which is the calcium chloride/sodium chloride containing liquor produced as a waste effluent in the ammonia soda process and sulphuric acid in an aqueous system at a temperature which is above the calcium sulphate hemihydrate/calcium sulphate dihydrate (gypsum) transition temperature under the reaction conditions.

2. A process according to claim 1 wherein the sulphuric acid contains 40 to 98% by weight of $H_2SO_4$.

3. A process as claimed in claim 2 wherein the sulphuric acid is an impure sulphuric acid effluent.

4. A process as claimed in claim 1 wherein the reaction is carried out at a temperature of at least 20° C. above the hemihydrate/gypsum transition temperature.

5. A process as claimed in claim 4 wherein the reaction is carried out in the range 95° C. to 100° C. at atmospheric pressure and alpha-hemihydrate is separated from the reaction mixture at about 100° C.

6. A process as claimed in claim 4 wherein the alpha-hemihydrate is separated from the reaction mixture at a temperature above the hemihydrate/gypsum transition temperature to give moist alpha-hemihydrate and a liquor comprising hydrochloric acid, and the moist alpha-hemihydrate is subsequently washed with water and dried to give dry alpha-hemihydrate.

7. A process as claimed in claim 6 wherein the associated liquor and the washings are cooled to precipitate gypsum, the gypsum is separated recycled to the reaction between calcium chloride solution and sulphate ions, and the hydrochloric acid liquor and washings are recovered.

8. A process as claimed in claim 4 wherein the reaction is carried out at 140° C. to 160° C. at 5-10 atmospheres absolute.

9. A process as claimed in claim 8 wherein the alpha-hemihydrate is separated from the reaction mixture at a temperature above the hemihydrate/gypsum transition temperature to give a moist solid and an associated liquor comprising hydrochloric acid, and the moist solid is subsequently washed with water and dried at 100-120° C. to give dry alpha-hemihydrate.

* * * * *